United States Patent [19]

Suzuki

[11] Patent Number: 4,462,669

[45] Date of Patent: Jul. 31, 1984

[54] SELF-TIMER DEVICE FOR CAMERA

[75] Inventor: Nobuyuki Suzuki, Kanagawa, Japan

[73] Assignee: Canon Kabushiki Kaisha, Tokyo, Japan

[21] Appl. No.: 407,279

[22] Filed: Aug. 11, 1982

[30] Foreign Application Priority Data

| Aug. 18, 1981 | [JP] | Japan | 56-129174 |
| Aug. 18, 1981 | [JP] | Japan | 56-122186[U] |
| Aug. 19, 1981 | [JP] | Japan | 56-130770 |
| Dec. 17, 1981 | [JP] | Japan | 56-204956 |

[51] Int. Cl.$^3$ .................... G03B 17/18; G08B 3/00
[52] U.S. Cl. ........................ 354/400; 354/195.1; 354/289.12; 340/384 E

[58] Field of Search ............... 354/25 R, 60 E, 60 L, 354/237, 238, 289, 195, 400, 195.1, 195.13, 238.1, 289.12, 467; 179/1 VL; 340/75, 384 E; 381/104–109

[56] References Cited

U.S. PATENT DOCUMENTS 4,322,146  3/1982  Shimizu ..................... 354/238 X Primary Examiner—William B. Perkey
Attorney, Agent, or Firm—Toren, McGeady and Stanger

[57] ABSTRACT

A camera self-timer device of the type indicating the operating state thereof by a sound producing in different degrees of loudness or volume according to the distance between the camera and the object to be photographed varies to always inform the camera operator of the operation of the self-timer with a suitable loudness or volume of sound.

10 Claims, 18 Drawing Figures

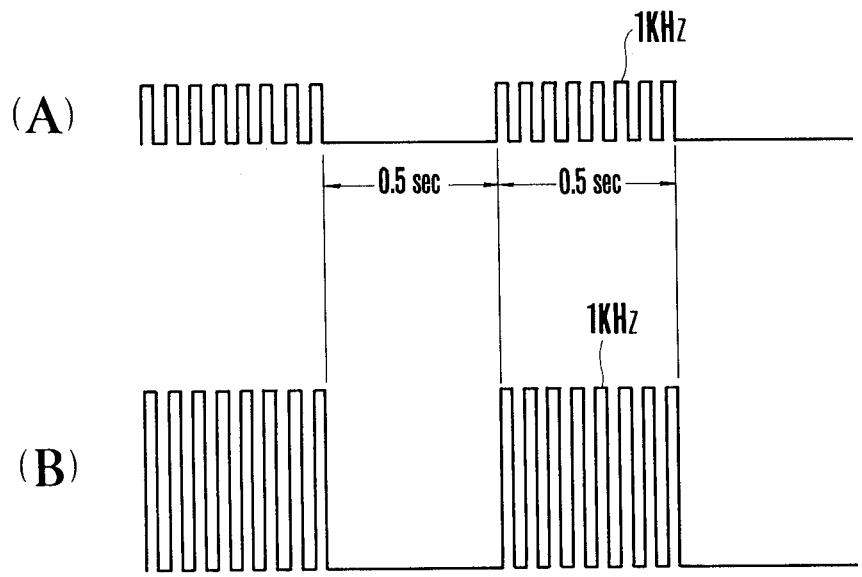
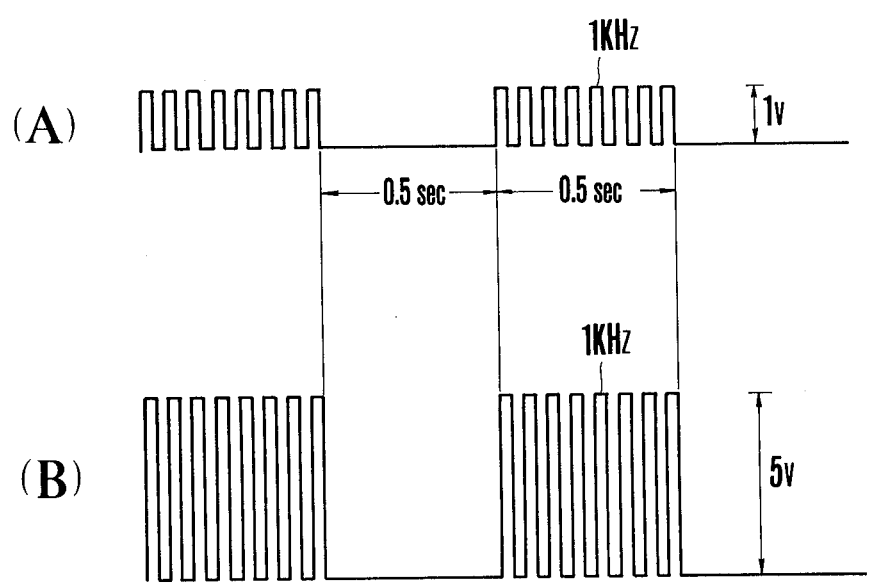

F I G.15
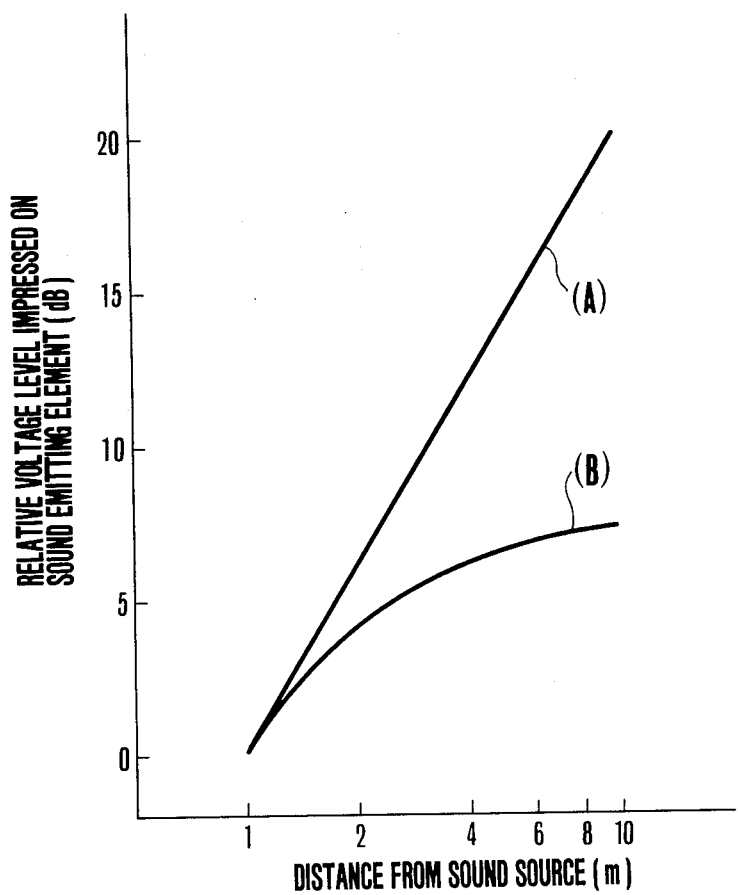

# SELF-TIMER DEVICE FOR CAMERA

BACKGROUND OF THE INVENTION

1. Field of the Invention

This invention relates generally to a self-timer device for a photographic camera of the type informing the photographer of the operating state thereof by a sound and more particularly to a self-timer device which produces the sound in different degrees of loudness or volume according to the varying distance between the camera and an object to be photographed.

2. Description of the Prior Art

There have been known various kinds of cameras which inform the camera user with a sound that a self-timer is in operation. However, since all these cameras have a fixed loudness or volume of sound produced from a sound emitting element, the sound is hardly audible when the distance between the camera and the user of the camera (or an object to be photographed in this instance) increases. This problem may be solved by making the loudness or volume of sound sufficiently great to make it audible at a relatively long distance. Such an arrangement, however, not only tends to become a nuisance to people around the camera but makes it difficult to take a natural picture since such a loud sound draws the attention of people to the user making him or her uneasy.

To solve these problems, there has been proposed a switch arrangement to vary the volume or loudness of sound produced from a sound emitting element. However, since this arrangement necessitates a switching operation, it cannot be considered a satisfactory solution because of the possibility of failing to perform the switching operation.

It is, therefore, an object of the present invention to provide an improved self-timer device for a camera which overcomes the disadvantages of prior art devices.

It is another object of the invention to provide a self-timer device for a camera in which the loudness or volume of sound coming from a sound emitting element heard at the position of the object to be photographed is shifted to a suitable volume or loudness in response to the focusing operation of the camera.

It is a further object of the invention to provide a self-timer device for a camera in which the volume or loudness of sound coming from a sound emitting element heard at the position of the object to be photographed is adjusted to a suitable value by means of a distance measurement signal of the camera automatic focusing device.

It is still another object of the invention to provide a display device for a camera in which the volume or loudness of sound produced by a sound emitting element is controlled according to the distance between a photo-taking lens and an object to be photographed; and, when the distance to the object exceeds a certain given limit, the sound emission is stopped and, at the same time, a light emitting element is actuated to visually indicate a self-timer operation.

These and further objects and features of the invention will become apparent from the following detailed description of embodiments thereof taken in conjunction with the accompanying drawings:

SUMMARY OF THE INVENTION

It has now been found that these objects may be attained in a self-timer device for a camera which includes delay means for delaying the initiation of a shooting operation of the camera for a predetermined time interval. The apparatus may also include acoustic means for producing a signal sound to confirm operation of the self-timer device and means for varying the volume or loudness of the signal sound by the acoustic means in response to the distance between an object to be shot and the camera. The volume or loudness varying means increases the volume or loudness in accordance with an increase in distance.

BRIEF DESCRIPTION OF THE DRAWINGS

FIG. 2 is a timing-level wave form chart showing the operation of the embodiment shown in FIG. 1.

FIG. 4 is a timing-level wave form chart showing the operation of the second embodiment shown in FIG. 3.

FIG. 6(a) shows the release button in a locked condition.

FIGS. 14 and 15 are graphs further illustrating the fourth embodiment.

DESCRIPTION OF THE PREFERRED EMBODIMENTS

Figure 1:
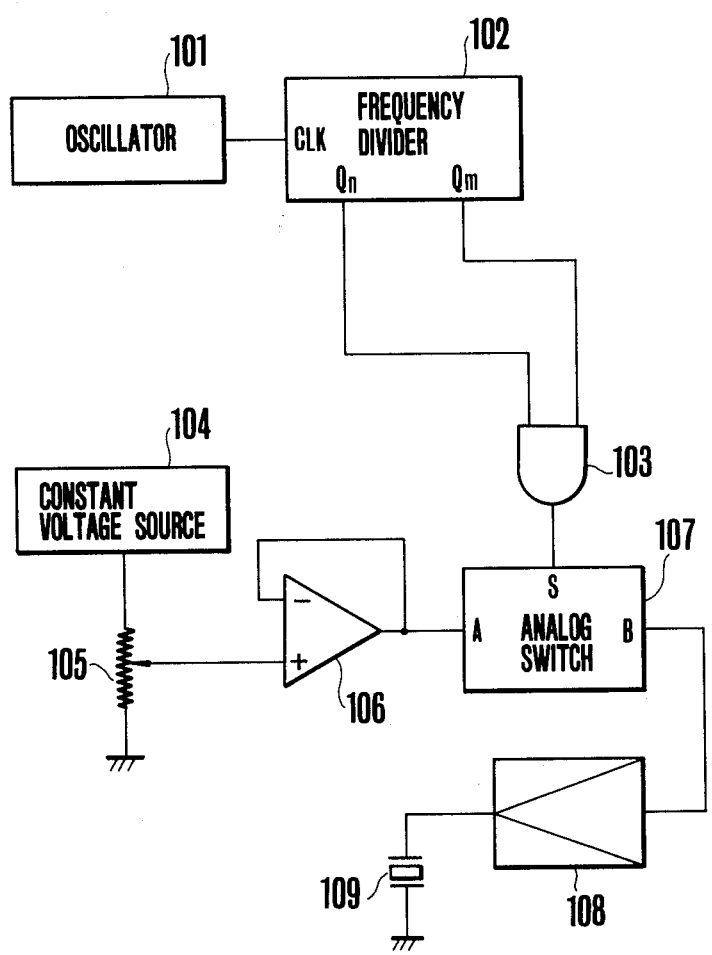
FIG. 1 is a circuit block diagram showing a self-timer device in an embodiment of the present invention.

FIG. 1 shows a block diagram of a self-timer device in a first embodiment of the invention. The embodiment comprises an oscillator 101 which produces clock pulses; a frequency divider 102 which has the clock pulses supplied to its terminal CLK from the oscillator 101 and which produces frequency divided outputs from terminals Qn and Qm, the frequency division ratio of Qm being larger than Qn; an AND circuit 103; and a constant voltage source 104 which supplies a constant voltage to a variable resistor 105. The variable terminal of the variable resistor 105 operates in association with a distance setting means such as a distance ring or a slider or the like which is provided for focusing a lens (not shown) on an object to be photographed. When the distance setting means is set at a long distance position, the resistance value between the variable terminal and the ground, i.e. the voltage at the variable terminal, increases. The resistance value between the variable terminal and the ground, i.e. the voltage at the variable terminal, becomes small when the distance setting means is set at a short distance position.

The embodiment further includes an operational (OP) amplifier 106 which is arranged as a voltage follower. The voltage from the variable resistor 105 is impressed on the non-inversion input terminal (+ input terminal) of an OP amplifier 106. This input is converted into a low impedance before it is produced from the OP amplifier 106. A reference numeral 107 identifies an analog switch which is provided with terminals S, A and B. When the level of the terminal S becomes high, there takes place a short-circuit between the terminals A and B to turn the switch 107 on. There is provided an amplifier 108 which has a sufficient gain for driving a sound emitting element 109. The sound emitting element 109 is composed of an electric-to-sound converter such as a piezo-electric buzzer, an electromagnetic speaker or the like.

The embodiment which is shown in FIG. 1 operates as shown in FIG. 2, which shows the wave form of a voltage to be impressed on the sound emitting element 109. The wave form shown in FIG. 2(A) is obtained when a distance setting value set at distance setting means, such as the distance setting ring of a lens, is small. Another wave form shown in FIG. 2(B) is obtained when the distance setting value is large. In FIG. 2, the voltage level is indicated in the vertical direction while time is indicated in the lateral direction. The clock pulses from the oscillator 101 are supplied to the terminal CLK of the frequency divider. As a result, there are produced frequency divided output from the terminals Qn and Qm. For example, the output from the terminal Qn is 1 KHz while the output of the terminal Qm is 1 Hz. The two outputs are passed through the AND circuit 103 to give a pulse output which intermittently continues for a period of 0.5 sec. at 1 KHz. Following this, a zero output continues for another period of 0.5 sec. The pulse output of 1 KHz and the zero output alternately appear thereafter. An indicative sound is formed on the basis of this, continuously sounding "peep, peep, peep, . . . " In conventional cameras, the quantity of this sound is unvarying. Whereas, in this embodiment, the sound level is variable for obtaining a suitable degree of loudness or volume of sound in the following manner: A constant voltage from the constant voltage source 104 is impressed on the variable resistor 105 which operates in association with the distance ring of the lens, which is not shown. Then, the voltage of the variable terminal of the variable resistor 105 is applied to the non-inversion input terminal of the OP amplifier 106. Accordingly, the voltage of the variable terminal of the variable resistor 105 appears as it is in the output of the OP amplifier 106. The output of the OP amplifier 106 is supplied to the terminal A of the analog switch 107. Meanwhile, the above stated output of the AND circuit 103 has been supplied to the terminal S of the analog switch 103. Therefore, at the terminal B of the analog switch 103, there appears the voltage of the OP amplifier 106, which is switched by the output of the AND circuit 103. In this instance, the voltage of the variable resistor 105, which operates in association with the distance setting means such as the distance ring of the lens (not shown), varies according to the distance setting value. For example, the output voltage of the OP amplifier 106 is low when the distance value is small. Then, the low voltage is switched at the analog switch 107 and, after this switching, is supplied to the amplifier 108. The amplifier 108 amplifies it until the output becomes sufficient for driving the sound emitting element 109 as shown in FIG. 2(A). This output is impressed on the sound emitting element 109. The sound emitting element 109 then produces a relatively small basic frequency pulse sound of 1 KHz at intervals of 0.5 sec.

However, the voltage of the variable resistor 105 is high when the distance setting value set at the distance setting means of the lens, which is not shown, is large. Accordingly, the output voltage of the OP amplifier 106 is also high. The output of the OP amplifier 106 is switched by the analog switch 107 in the same manner as in the above stated case. The switched output is then amplified at the amplifier 108 and drives the sound emitting element 109 at a higher level (See FIG. 2(B)) than the level obtained when the distance setting value is small. Accordingly, a relatively loud basic frequency pulse sound of 1 KHz is produced at intervals of 0.5 sec.

As described in the foregoing, in the embodiment, the operation of the camera self-timer is indicated as follows: The volume or loudness of the sound from the sound emitting element is high when the distance between the camera and the object to be photographed is long and, accordingly, the distance setting value determined through the distance setting action of the lens is large. Conversely, the volume or loudness of the sound from the sound emitting element is low when the distance between the camera and the object is short and the distance setting value determined by the distance setting action of the lens is small. Therefore, at the position of the object, the operation of the self-timer can be confirmed through an unvarying volume or loudness of sound. This sound adjustment does not require any extra operation other than ordinary focusing on the object, which is carried out in the same manner as in conventional cameras. This is a great advantage.

Figure 3:
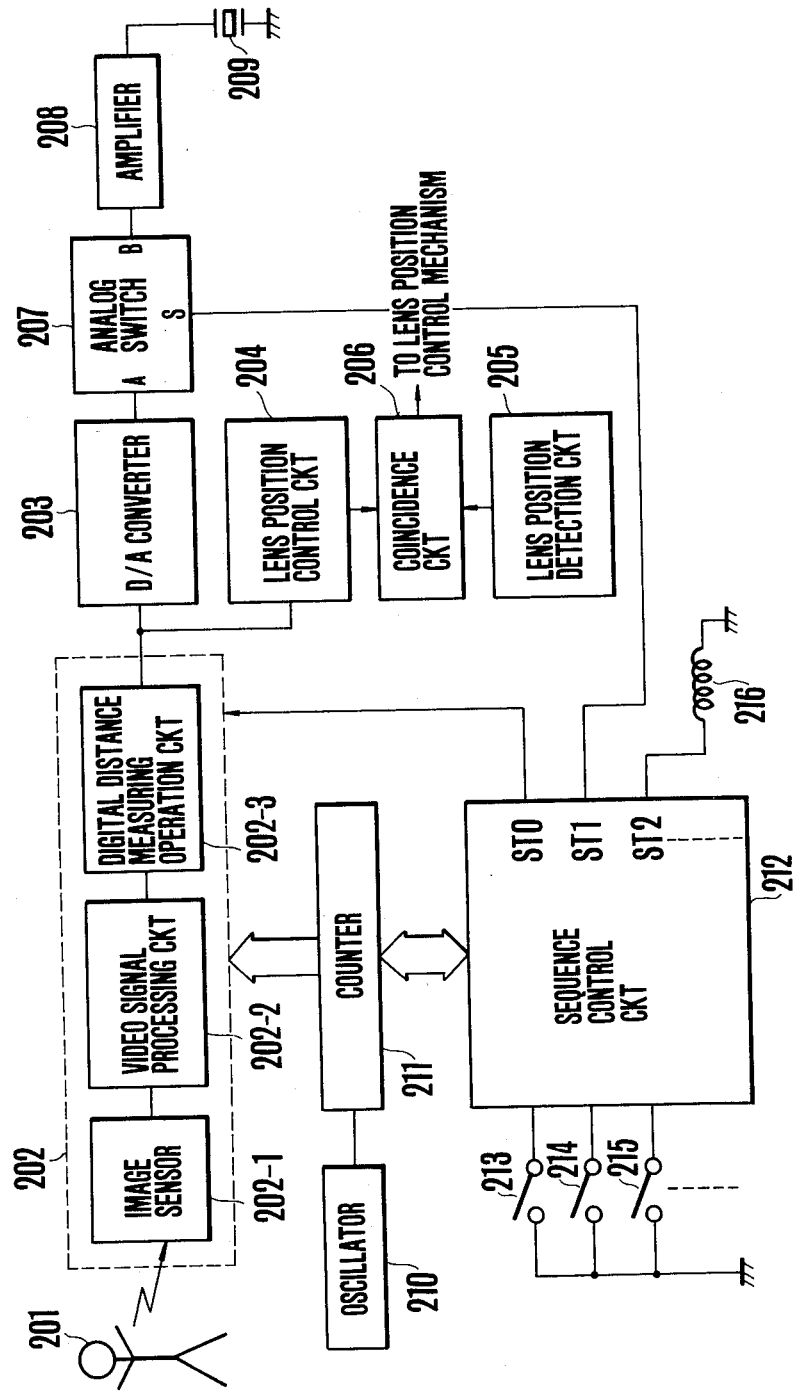
FIG. 3 is a circuit block diagram showing a self-timer device in a second embodiment of the invention.

FIG. 3 is a block diagram of a self-timer device in accordance with a second embodiment of the invention. A reference numeral 201 identifies an object to be photographed. Another reference numeral 202 identifies a known distance measuring device of the double image coincidence type, such as the device disclosed in a Japanese Laid-Open patent application No. 54-51556 corresponding to a U.S. Pat. No. 4,305,657 issued on Dec. 15, 1981 or a Japanese Laid-Open patent application No. 55-115023 corresponding to a U.S. patent application Ser. No. 121,690 filed on Feb. 15, 1980. The distance measuring device 202 obtains a datum on distance through positional correlation between two images formed by two optical systems. The device 202 consists of an image sensor 202-1 which is CCD or the like and which converts the image of the object 201 into an electrical quantity (a video signal); a video signal processing circuit 202-2, which amplifies the video signal produced from the image sensor 202-1 and quantizes it into a binary signal; and a digital distance measuring operation circuit 202-3. The binary signal produced from the video signal processing circuit 202-2 is digitally computed at the digital distance measuring operation circuit 202-3, which produces a digital distance signal. The digital signal, for example, represents the distance between the camera and the object and shows it as one of 43 steps of a zone between infinity expressed by 0 and the nearest point which is expressed by 42. The digital distance signal, produced in this manner from the digital distance measuring operation circuit 202-3, is converted to an analog voltage by a D/A converter 203. This voltage varies stepwise according to the distance within the 43 steps of the zone. For example, the voltage is 5 V at infinity and 1 V at the nearest point and thus varies by about 93 mv at every step. A lens position control circuit 204 converts the digital distance measurement signal from the distance measuring device 202 to a lens control signal and produces the signal for setting the lens, which is not shown, in a position determined on the basis of the distance measurement signal. A lens position detection circuit 205 produces a digital signal corresponding to the lens position. A coincidence circuit 206 compares the signal from the lens position control circuit 204 with the digital signal of the lens position detection circuit 205 and produces a signal when the two signals coincide with each other. This output of the coincidence circuit 206 is applied to a known lens position control mechanism, which is not shown, to stop the backward or forward movement of the lens. An analog switch 207 turns on with a short-circuit between the terminals A and B thereof when the level of the terminal S thereof becomes high. An amplifier 208 has a sufficiently high grain for driving a sound emitting element 209. This sound emitting element 209 may be selected from electric-to-sound converters such as a piezo-electric buzzer, and electromagnetic speaker, etc. An oscillator 210 produces clock pulses. A counter 211 receives the clock pulses from the oscillator 210 and, in response to a signal from a sequence control circuit 212, which will be described hereinafter, divides the frequency of the clock pulses in a suitable manner. The frequency divided clock pulses are supplied to the sequence control circuit 212 and the distance measuring device 202. The sequence control circuit 212 controls, one after another, sequence statuses ST0, ST1, ST2, . . . in accordance with the status of input means such as switches 213, 214, 215, etc. which will be described hereinafter, and the signal of the counter 211. The status ST0 is for light measurement and distance measurement. In the status ST0, the distance measuring device 202 and a light measuring circuit, which is not shown but determines an exposure, are operated to measure the distance to the object and the brightness of the external light. The sequence status ST1 is for the self-timer which operates when the switch 215 is on. In this status ST1, the sound emitting element 209, which will be further described later, produces a sound indicating that the self-timer is in operation. Another sequence status ST2 is for shutter control. In this status ST2, a shutter driving magnet 216 controls the exposure on the basis of a measured light value obtained in the status ST0.

In the sequence control circuit 212, the level of the terminal ST0 becomes high. The high level of the terminal ST0 operates the distance measuring device 202. In the meantime, the levels of the other terminals ST1 and ST2 remain low. In the status ST1, the terminals ST0 and ST2 are at a low level. Meanwhile, the terminal ST1 produces an intermittent pulse output at 1 KHz for 0.5 sec. and a zero output for the next 0.5 sec. in an alternately repeating manner over a period of 10 consecutive sec. Next, in the status ST2, the terminal ST2 level becomes high just for the period of exposure exciting the shutter driving magnet 216. In this case, the other terminals ST0 and ST1 remain at a low level. The sequential operation progresses further. However, since further operation is irrelevant to the subject matter of the invention, it is omitted from description.

A switch 213 operates in response to the first stroke of a depressing operation on a shutter button, which is not shown. With this switch 213 turned on, the power supply to each circuit is effected from a power source, which is not shown. The sequence control is then initialized at the status ST0. Another switch 214 operates in response to the second stroke of the depressing operation on the shutter button, which is not shown. With this switch 214 turned on, the sequence proceeds from the status ST0. There is further provided a switch 215 which is used for setting a self-timer operation mode. With this switch 215 turned on, when the switches 213 and 214 are turned on, the sequence operation proceeds from the status ST0 to the status ST1 and the sound emitting element 209 produces the self-timer operation indicating sound over a period of 10 sec. Furthermore, with the switch 215 off, when the switches 213 and 214 are turned on, the sequence operation proceeds from the status ST0 directly to the status ST2 without going through the status ST1. A shutter driving magnet 216 is then controlled on the basis of a light measurement value obtained during the status ST0 thereby determining an exposure.

Referring now to FIG. 4 in conjunction with FIG. 3, that embodiment operates in the following manner: FIG. 4 shows the voltage wave form of the terminal B of the analog switch 207 shown in FIG. 3. The wave form shown in FIG. 4(A) is obtained when the distance measurement signal of the distance measuring device 202 represents the nearest point. The wave form shown in FIG. 4(B) is obtained when the distance measuring signal of the distance measuring device 202 represents infinity. The voltage level is indicated in the vertical direction and time in the lateral direction of the drawing.

First, the first stroke of a depressing operation on the shutter button, which is not shown, turns on the switch 213 effecting the power supply to each circuit. With the switch 213 turned on, the status ST0 of the sequence control circuit 212 is initialized. The clock pulses from the oscillator 210 are supplied to the counter 211 and are frequency divided there. The frequency divided outputs of the counter 211 is supplied to the component parts of the distance measuring device 202. The image of the object 201 is converted into a video signal at the image sensor 202-1. The video signal is amplified at the video signal processing circuit 202-1 and is quantified there to a binary signal. The binary signal is digitally computed at the digital distance measuring operation circuit 202-3, which then produces a digital distance measurement signal. Distance measurement is continuously performed during the first stroke depression of the shutter button. Meanwhile the terminal ST0 of the sequence control circuit 212 controls the distance measuring device 202 in such a manner that a final distance measurement datum is held at the digital distance measuring operation circuit 202-3 the instant the status ST0 terminates in response to the second depression stroke of the shutter button.

The digital distance measurement signal produced from the digital distance measuring operation circuit 202-3 is converted to an analog voltage at the D/A converter 203. The value of this voltage is 5 V for a digital value of 0 at an infinite distance and 1 V for a digital value of 42 at the closest point. The analog voltage thus obtained is supplied to the terminal A of the analog switch 207. However, since the status ST0 still persists and the level of the terminal ST1 is low as long as the shutter button is in the first depression stroke, the terminal S of the analog switch 207 is also at a low level. In other words, no output appears at the terminal B of the analog switch 207. Accordingly, the output of the amplifier 208 is also zero and the sound emitting element 209 has no voltage impressed thereon. Therefore, the sound emitting element remains silent. Meanwhile, at the first stroke of the shutter button, a light measuring circuit, which is not shown, also operates to determine an exposure value required for a correct exposure.

When the shutter button is depressed further to the second stroke with the switch 215 for the self-timer turned on, that is, when all the switches 213, 214 and 215 are on, the sequence proceeds from the status ST0 to the status ST1. At this time, the levels of the terminals ST0 and ST2 of the sequence control circuit 212 become low. Therefore, the final distance measurement datum is held at the digital distance measuring circuit 202-3 and the shutter driving magnet is not excited. Meanwhile, the terminal ST1 produces an output which continues for a total period of 10 seconds consisting of an alternation of an intermittent pulse output which continues at 1 KHz for 0.5 sec. and an ensuing zero output which continues for the next 0.5 sec. This output of the terminal ST1 is supplied to the terminal S of the analog switch 207. As a result, the signal of the terminal A of the analog switch 207 is switched by the signal of the terminal ST1 and the switched signal appears at the terminal B of the analog switch 207. As mentioned in the foregoing, where the final distance measuring datum represents the nearest point during the status ST0, the D/A converter 203 produces 1 V and it is this 1 V that is switched by the signal of the terminal ST1. Then, the signal thus obtained at the terminal B of the analog switch 207 is as shown in FIG. 4(A). This signal is amplified to a suitable extent at the amplifier 208 before it is impressed on the sound emitting element 209. In this case, the sound emitting element 209 produces the smallest sound.

On the other hand, the final distance measurement datum obtained during the status ST0 represents infinity, the D/A converter 203 produces 5 V. This output of the converter 203 is switched by the signal of the terminal ST1. Then a signal that appears at the terminal B of the analog switch 207 is as shown in FIG. 4(B). Then, the amplifier 208 amplifies this signal at the same rate of amplification as in the nearest point before it is impressed on the sound emitting element 209. Then, the loudest sound is produced from the sound emitting element 209. The zone from the closest point through infinity is divided into 43 steps and the volume or loudness of the sound of the sound emitting element 209 varies stepwise in such a manner that it increases as the distance gets closer to infinity. As mentioned above, the volume or loudness of the sound of the sound emitting element 209 in the status ST1, which represents a self-timer operation mode, is thus varied on the basis of the distance measurement datum obtained during the status ST0. Therefore, as heard at the varied positions of objects to be photographed, the sound of the sound emitting element 209 always sounds for 10 seconds at about the same volume or loudness.

At the point in time when the status ST0 changes to the status ST1 or when the status ST0 changes to the status ST2 with the shutter button depressed to the second stroke while the switch 215 is off, the movement of the lens is controlled, through the lens position control circuit 204, the lens position detection circuit 205, the coincidence circuit 206 and a lens position control mechanism, which is not shown, on the basis of the distance measurement datum obtained from the distance measuring device 202. Through this control, the lens is set in an in-focus position. More specifically, the final distance measurement datum (or a digital distance signal) obtained at the digital distance measuring operation circuit 202-3 is supplied to the lens position control circuit 204. This datum is converted to a lens control signal at the lens position control circuit 204. The signal is then produced from the lens position control circuit 204 to set the lens, which is not shown, into a position based on the datum, i.e. the distance signal. The movement of the lens begins in response to this signal and at the transistion point of the status ST0. Commencing the lens movement, the lens position detection circuit 205 produces a digital signal corresponding to the position of the lens. This signal is compared with the above lens position setting signal at the coincidence circuit 206. When the two signals coincide with each other, a coincidence signal is produced from the circuit 206 and is supplied to the lens position control mechanism, which is not shown. Then, the backward or forward movement of the lens is stopped and the lens is set in a position corresponding to the distance between the camera and the object to be photographed.

When the sequence enters the status ST2 after completion of the statuses ST0 and St1, the levels of the terminals ST0 and ST1 become low while that of the terminal ST2 becomes high. The level of the terminal S of the analog switch 207 then becomes low. Therefore, the connection between the terminals A and B turns off so that no sound will be produced from the sound emitting element 209. Furthermore, the high level of the terminal ST2 of the sequence control circuit 212 continues for the length of the exposure time based on the light measurement value obtained during the status ST0. With the terminal ST2 continuing at the high level, the shutter driving magnet is excited to control the shutter, so that a photograph of sharp focus and correct exposure can be obtained.

In the above description, the sequence control is effected in the order of the statuses ST0, ST1 and ST2. However, the status ST1 for the self-timer is omitted and the status ST0 changes directly to the status ST2 to complete an exposure when the shutter button is depressed to the second stroke thereof with the self-timer switch 215 off.

In this particular embodiment, the distance measuring device 202 is controlled by the signal of the terminal ST0 of the sequence control circuit 212; the final distance measurement datum is held at the digital distance measuring operation circuit 202-3 when the status ST0 shifts to another status; and the status ST1 for the self-timer operation begins after the lens position is determined on the basis of the datum. However, this invention is not limited to such a sequential arrangement. In accordance with the invention, it is also possible to perform distance measurement during the status ST1 for the self-timer operation; and to determine the lens position by controlling the lens position concurrently with the completion of the status ST1. In the latter arrangement, even if the object moves to a different position during the self-timer operating status ST1, the lens is still capable of following the object and can be set in a position corresponding to the new position of the object. Besides, the volume or loudness of the sound can also be changed accordingly during the status ST1. This is an additional advantage of the latter arrangement.

In the embodiment described above, a sound produced by a sound emitting element which is incorporated in an automatic focusing type camera is used for confirmation of the operation of a self-timer; and the quantity or volume or loudness of the sound increases when the distance between the camera and the object to be photographed is long and decreases when this distance is short. This arrangement enables the photographer of the object to be photographed to unfailingly confirm the operation of the self-timer irrespective of distance variations between the camera and the object through the almost unvarying sound volume or loudness. Another advantage of the embodiment resides in that the above stated advantageous feature is attainable by utilizing a distance measurement signal, which is used for lens position control. Therefore, the embodiment can be obtained by merely adding a D/A converter and an analog switch to the electric circuit of the conventional automatic focusing type camera.

Figure 5:
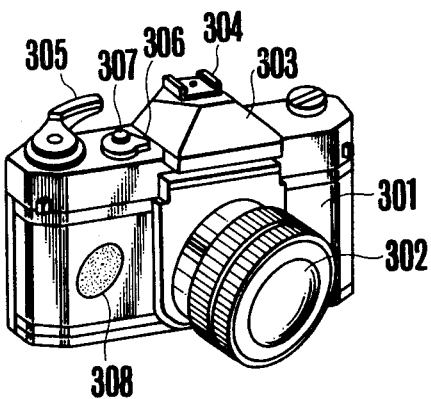
FIG. 5 is an oblique view showing the appearance of a camera equipped with a self-timer device in a third embodiment of the invention.

FIG. 5 represents the appearance of a single lens reflex camera provided with a self-timer device in a third embodiment of the invention. The camera includes a camera body 301; an interchangeable phototaking lens 302; an upper cover 303 of the camera body; an accessory shoe 304 which is mounted on the upper cover 303; a winding lever 305; and a lever 306 for setting the self-timer device and for locking a shutter button. The camera is shiftable between a shutter button locked state, a normal photographing state and a prepared state for self-timer photography by adjusting an index provided on the lever 306 to one of fixed indexes "L", "A" and "S". The shifting is then effected by a switch-over mechanism provided within the camera body. The camera further includes a shutter button 307 and a sound emitting element 308 which is tightly mounted on the camera body 301 and which indicates that the self-timer device is in operation.

Figure 6A:
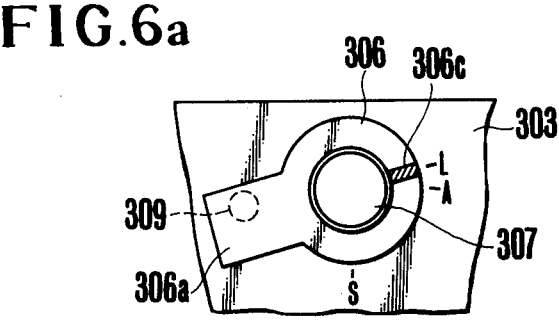
FIGS. 6(a), (b) (c) and are plan views showing positional relation between a self-timer setting lever and fixed indexes.
Figure 6B:
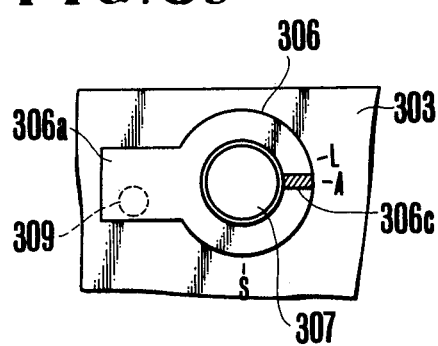
FIG. 6(b) shows the camera when it is set in an ordinary photo-graphing mode.

The positional relation or the self-timer setting lever 306 to the fixed indexes "L", "A" and "S" mentioned above is as shown in FIGS. 6(a), (b) and (c). Referring now to FIG. 6, the reference numeral 309 identifies an indication light emitting diode. The light emitting diode 309 assumes an indicating state when the self-timer device is in use. However, under the condition illustrated in FIG. 5, the light emitting diode 309 is covered by the lever 306 and is not seen. When an index 306c on the self-timer setting lever 306 which is disposed coaxially with the shutter button 307 is adjusted to the fixed index L provided on the upper cover as shown in FIG. 6(a), a switch-over mechanism, which is not shown, inhibits the shutter button from being depressed and this adjustment thus locks the shutter button. In this case, the light emitting diode 309 is covered by the fore end portion 306a of the self-timer setting lever 306, as shown in the drawing, and is not seen from outside. When the index 306c of the self-timer setting lever 306 is adjusted to another fixed index A as shown in FIG. 6(b), the switch-over mechanism, which is not shown, renders the shutter button depressible. Under this condition, when the shutter button 307 is depressed, a power source switch, which is not shown, is closed.

Figure 6C:
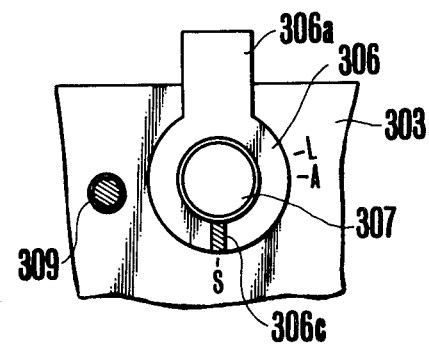
FIG. 6(c) shows the camera set in a self-timer photographing mode.
Figure 7:
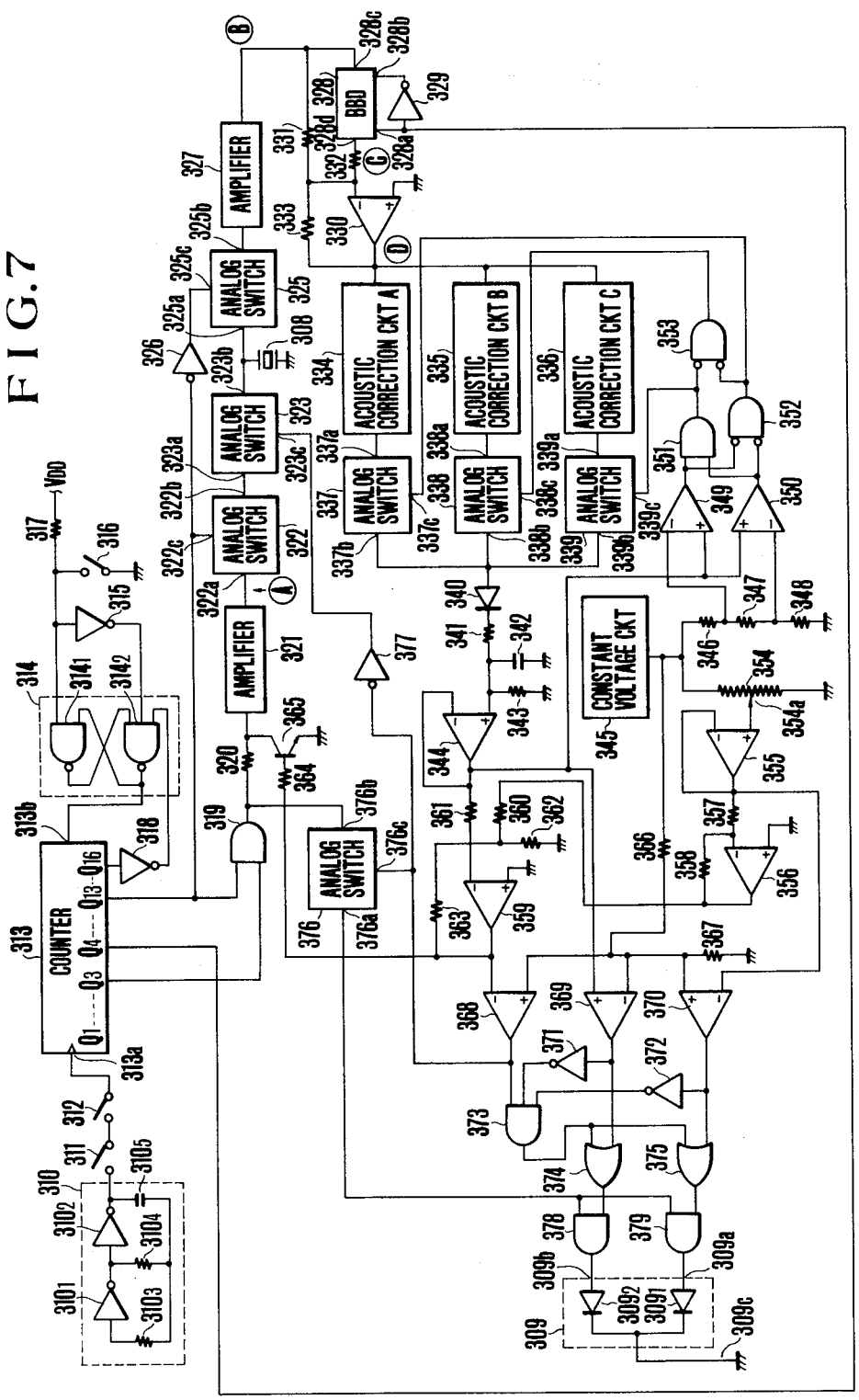
FIG. 7 is a circuit diagram showing the self-timer circuit of the camera shown in FIG. 5.

Then, with the shutter button further depressed, photography is performed. Meanwhile, the light emitting diode 309 is still covered by the fore end portion of the self-timer setting lever 306 and is not observable from the outside, as shown in FIG. 6(b). When the index 306c of the self-timer setting lever 306 is adjusted to the fixed index S as shown in FIG. 6(c), a self-timer setting switch 312, which is shown in FIG. 7, closes. In this embodiment, the light emitting diode 309 is uncovered by the fore end portion 306a of the self-timer setting lever 306 to render its light observable by the photo-grapher or from the position of the object to be photographed.

Under that condition, when the shutter button 307 is depressed, the power source switch is turned on. After that, further depression of the shutter button 307 turns on a self-timer operation switch 311, shown in FIG. 7. Normally, a sound emitting element 308 then produces an intermittent sound to inform the photographer that the camera is in the self-timer photographing mode. However, in cases where either environmental sound or noise around the camera are too loud and where the distance between the camera and the object to be photographed is too long, the sound emitting element 308 ceases to produce the sound. With the ceased emission of sound, the light emitting diode 309 emits a light which flickers for the same period as the intermittent sound indicating thereby that the camera is in the self-timer photographing mode. After a predetermined period of time, the photography is automatically carried out.

The self-timer circuit of the camera, shown in FIG. 5, is as shown in FIG. 7. In FIG. 7, reference numerals 308 and 309 respectively indicate the sound emitting element and the light emitting diode, which are shown in FIGS. 5 and 6.

In this self-timer circuit, an oscillator 310 generates basic frequency clock pulses of 8.192 KHz. The oscillator 310 supplies the clock pulses to a clock input terminal 313a of a counter 313 through switches 311 and 312. The oscillator 310 is composed of inverters $310_1$ and $310_2$, resistors $310_3$ and $310_4$, and a capacitor $310_5$. A self-timer operation switch 311 closes in response to the second stroke of the shutter button 307. A self-timer setting switch 312 is closed by adjusting the self-timer setting lever 306 to the index A. The counter 313 frequency divides the clock pulses supplied to the clock input terminal 313a thereof and then produces pulses of different frequency division ratios from its Q terminals. Pulses of 1.024 KHz are produced from tne terminal Q3 of the counter 313. Pulses of 512 Hz are produced from the terminal Q4. Pulses of 1 Hz are produced from the terminal Q13. Pulses of the basic frequency of $\frac{1}{8}$ Hz are produced from the terminal Q16. When an input of a high level (hereinafter called an H level) is supplied to the reset terminal 313b of the counter 313, the counter 313 ceases to perform its frequency dividing action and all the Q terminals thereof are at a low level (hereinafter called an L level). An RS flip-flop is formed by NAND gates $314_1$ and $314_2$ and is connected to a reset terminal 313b of the counter 313. A reference numeral 315 identifies an inverter; and a reference numeral 316 identifies a switch. The switch 316 closes in response to the winding action of the winding lever 305, shown in FIG. 5, and opens in response to the travelling action of the trailing curtain of the shutter, which is not shown. A resistor 317 has its single terminal connected to a power source $V_{DD}$. An inverter 318 inverts the output of the terminal Q16 of the counter 313 and supplies it to the RS flip-flop 314. Numerals 319 and 320 indicate respectively an AND gate and a resistor. An amplifier 321 receives voltage at a connection point between the resistor 320 and a transistor 365, which will be described hereinafter, and amplifies this input to a sufficient extent for driving the sound emitting element 308. There is provided an analog switch 322 which has terminals 322a, 322b and 322c. When the terminal 322c becomes an H level, a short-circuiting occurs between the terminals 322a and 322b. (Analog switches, which will be described hereinafter, are all arranged in the same manner as this analog switch 322, that is, the part between points a and b becomes conductive when the level of another point c becomes high.) A numeral 323 denotes another analog switch. The sound emitting element 308 is composed of a piezoelectric buzzer, an electromagnetic speaker or the like and also serves as microphone. The circuit further includes an analog switch 325; an inverter 326; an amplifier 327 which amplifies a sound resonance or collection signal when the sound emitting element 308 serves as a microphone; and a BBD 328 (bucket brigade device) consisting of 512 steps. The BBD 328 is provided with terminals 328a, 328b, 328c and 328d. An analog signal from the amplifier 327 is supplied to the terminal 328c of the BBD 328. Then, this input signal is synchronously delayed with two-phase clock pulses of opposite phases supplied to the terminals 328a and 328b before the signal is produced from the terminal 328d. The circuit further includes an inverter 329; an operational (OP) amplifier 330; resistors 331, 332 and 333; an acoustic correction circuit A 334 which has a characteristic represented by a full line curve A in FIG. 10; an acoustic correction circuit B 335 which is represented by a dotted line curve B in FIG. 10; another acoustic correction circuit 336 which is represented by a full straight line C in FIG. 10; analog switches 337, 338 and 339; a diode 340; a resistor 341; a capacitor 342, which in conjunction with the diode 340 and the resistor 341 forms a mean value detection circuit; a resistor 343; an OP amplifier 344 which is connected as a follower to serve as a buffer amplifier; a constant voltage circuit 345 which supplies a constant voltage to a resistor 346, an information resistor 354 and a resistor 366 which will be described later; resistors 346–348 which jointly form a voltage dividing circuit for the voltage of the constant voltage circuit 345; comparators 349 and 350 which respectively compare the voltage of the OP amplifier 344 with the resistance of the connection point between the resistors 346 and 347 and with the resistance of the connection point between the resistors 347 and 348; an AND gate 351; a NOR gate 352; another NOR gate 353; an information resistor 354 which operates in association with a distance ring provided on the outer circumference of the lens 302 and the voltage of the variable terminal 354a which continuously varies from a value corresponding to the nearest distance point to a value corresponding to an infinite distance. The value of the voltage increases as the distance decreases. An OP amplifier 355 is connected as follower to serve as a buffer amplifier; another OP amplifier 356; resistors 357 and 358 which in conjunction with the OP amplifier 356 serve to invert the output of the OP amplifier 355; an OP amplifier 359; resistors 360–363 which compute the outputs of the OP amplifiers 344 and 356; a resistor 364; a transistor 365 which divides the output of the AND gate 319 with an impedance between the resistor 320 and the part between the collector and emitter of the transistor 365; resistors 366 and 367 which divide the voltage of the constant voltage circuit 345; comparators 368–370; inverters 371 and 372; an AND gate 373; OR gates 374 and 375; an analog switch 376; an inverter 377; and AND gates 378 and 379. The light emitting diode is composed of two light emitting diodes $309_1$ and $309_2$ and has its color variable. The light emitting diode $309_1$ emits a green color light and the other $309_2$ a red color light. The light emitting diode 309 is provided with three terminals 309a, 309b and 309c. Of these terminals, terminals 309a and 309b are anodes while the terminal 309c is a cathode.

Figure 12:
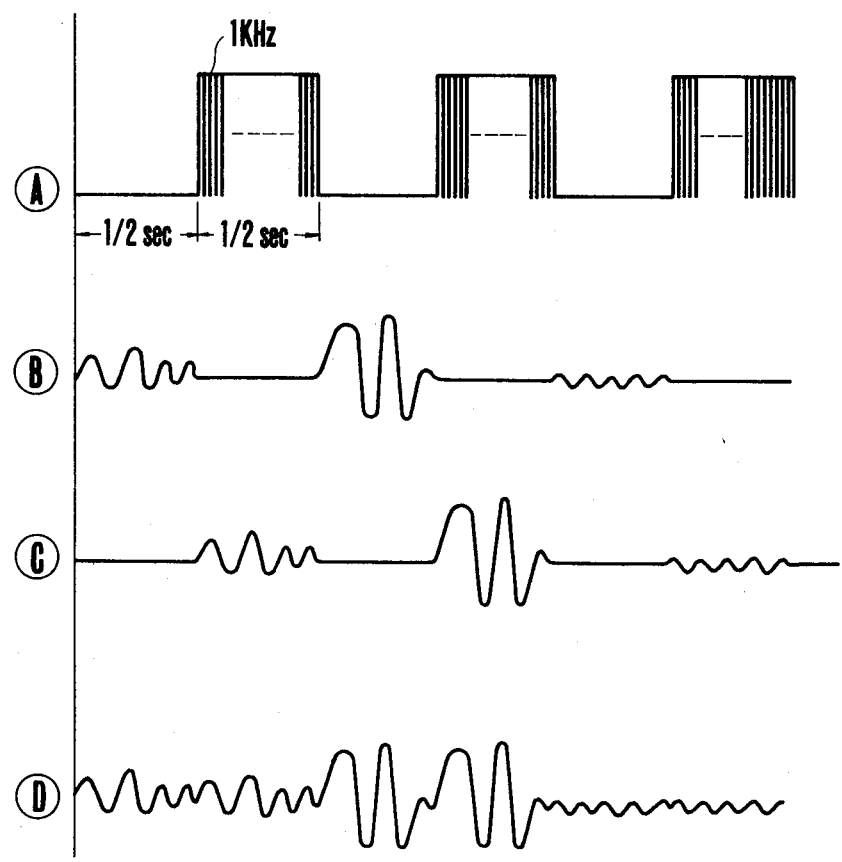
FIG. 12 is a chart showing the frequency characteristic of the circuit shown in FIG. 7.

The operation of the circuit arrangement, which has been described above, will be understood from the following description with reference to FIGS. 5, 7 and 12:

With the self-timer setting lever 306 as shown in FIG. 6(c), the self-timer setting switch 312 closes. Another switch 316 closes by the winding action of the winding lever 305. Then, the power source switch, which is not shown, is turned on by depressing the shutter button 306 supplying the power source voltage to each part of the camera. A further depression of the shutter button 306 turns the self-timer operation switch 311 on. With the switch 311 turned on, the pulses of the basic frequency 8.192 KHz of the oscillator 310 are impressed on the clock input terminal 313a of the counter 313. Since the switch 316 is on at that time during winding completion, the connection point level between the switch 316 and the resistor 317 is at an L level, that is, the level of one input terminal of the NAND gate $314_1$ in the RS flip-flop 314 becomes an L level. The output levels of the NAND gate $314_1$ and the inverter 315 are at an H level and the output of the inverter 318 is also at an H level until immediately before the terminal Q16 level of the counter 313 changes from an L level to an H level. Therefore, the output level of the NAND gate $314_2$ becomes an H level. The level of the reset terminal 313b becomes an L level and the counter 313 begins its clock action. Accordingly, the AND gate 319 produces an output of intermittent pulse waves as a product of the outputs of terminals Q3 and Q13, i.e. at 1.024 KHz (about 1 KHz) for ½ sec, and then an L level output for the next ½ sec. These outputs from the AND gate 319 are alternately produced with the identical timing of the voltage wave form, shown in FIG. 12(A). When the level of the terminal Q16 changes from L to H level, that is 8 seconds after the start of the clock action, the level of the inverter 318 becomes an L level. This changes the output levels of the NAND gate $314_2$ of the RS flip-flop 314 and the reset terminal 313b of the counter 313 to an H level stopping the clock action of the counter 313. Accordingly, a self-timer operation takes place for an 8 sec. period. The self-timer operation is indicated either by a sound produced from the sound emitting element 308 or by a flickering light produced from the light emitting diode when the distance to the object to be photographed is long. Meanwhile, the level change of the terminal Q16 of the counter 313 is used to trigger the operation of the shutter control circuit, which is not shown. This causes the leading curtain of the shutter, which is not shown, to begin to travel. Next, the self-timer operation for an 8 second period after the start of the clock action of the counter 313 is as described below:

As mentioned in the foregoing, during the high level period of the terminal Q13 of the counter 313, the terminal Q3 produces, through the AND gate 319, basic audible frequency pulses of about 1 KHz. The pulses are supplied to the amplifier 321 through the resistor 320. Then, after suitable amplification at the amplifier 321, the pulses are supplied to the terminal 322a of the analog switch 322. Since the analog switch 322 has its terminal 322c connected to the terminal Q13 of the counter 313, the part between the terminals 322a and 322b of the analog switch 322 is conductive while the pulses of 1 KHz are produced through the AND gate 319. Therefore, the output of the amplifier 321 appears as it is at the terminal 322b of the analog switch 322. Then, the output of the terminal 322b is impressed on the terminal 323a of the analog switch 323. However, whether the output is impressed on the sound emitting element 308 or not is determined by the level of the terminal 323c of the analog switch 323. Since the terminal 323c is connected to the inverter 377 while the input terminal of the inverter 377 is connected to the output terminal of the comparator 368, whether the part between the terminals 323a and 323b of the analog switch 323 becomes conductive or not is determined by the level of the comparator 368. The output level of the comparator 368 will be described hereinafter. Therefore, when the level of the terminal 323c of the analog switch 323 is high, the output voltage of the amplifier 321 is impressed on the sound emitting element 308. Then, the sound emitting element 308 produces an intermittent basic frequency pulse sound of 1 KHz at intervals of ½ sec during the self-timer operation period of 8 sec. Furthermore, during the rest of the period, i.e. during the ½ sec. period other than the 12 sec. sound emitting period, the sound emitting element 308 serves as a microphone. In other words, the terminal 322c of the analog switch 322 and the terminal 325c of the analog switch 325 respectively have signals of opposite phases supplied thereto through the inverter 326. Therefore, when the analog switch 323 is conductive, a signal corresponding to environmental sound or noise around the camera is produced from the sound emitting element 308, which is serving as a microphone during the period of no sound emission, and is supplied to the amplifier 327 through the analog switch 325 (with the part between the terminals 325a and 325b becoming conductive). Then, the signal or a voltage which corresponds to the environmental sound or noises around the camera and which is produced from the sound emitting element 308 is amplified at the amplifier 327 to a suitable degree before it is produced therefrom. The analog signal wave form of this output is as represented by the voltage wave form of FIG. 12(B). This output of the amplifier 327 is applied to the BBD 328 and the resistor 331. Basic frequency pulses of 512 Hz which are of opposite phases through the inventer 329, are supplied to the terminals 328a and 318b of the BBD 328 as mentioned in the foregoing. The relation of the delay time of the BBD 328 to the clock frequency can be expressed as follows:

$$tD = N/2fcp$$

wherein: tD represents the signal delay time, fcp clock frequency and N the number of transfer steps. Accordingly, the signal delay time tD of the BBD 328 in which the number of the transfer steps N is 512 becomes ½ sec. This is illustrated in FIGS. 12(B) and (C). The voltage wave form of (C) is delayed ½ a second from the voltage wave form of (B). The signal of the point (B) and the signal of the point (C) are added and inverted through the resistors 331 and 333 and the OP amplifier 330 to obtain a signal, as shown in FIG. 12(D), in voltage wave form. However, note that the voltage wave form of FIG. 12(D) shows the signal as in a phase inverted state.

Figure 8A:
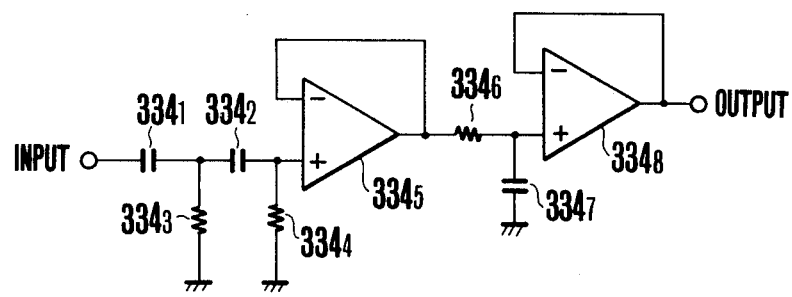
FIG. 8(a) is a circuit diagram showing the details of an acoustic correction circuit A shown in FIG. 7.
Figure 8B:
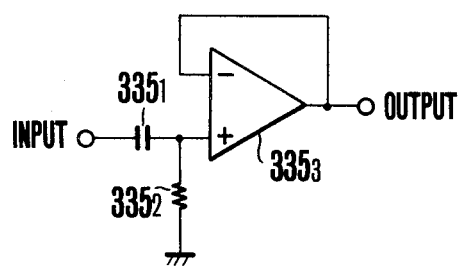
FIG. 8(b) is a circuit diagram showing the details of an acoustic correction circuit B shown in FIG. 7.
Figure 10:
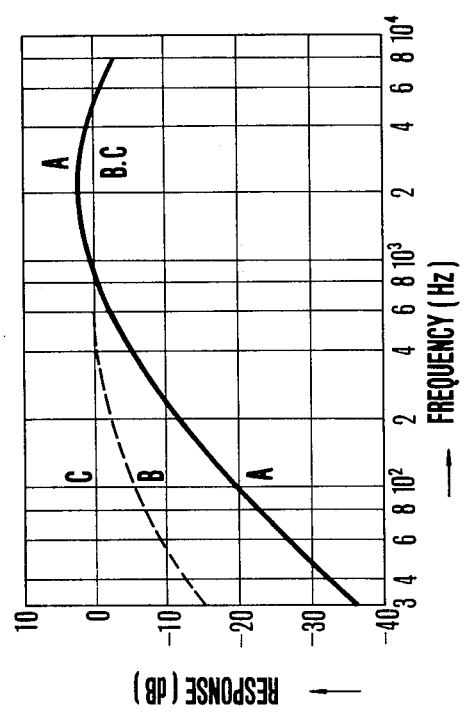
FIG. 10 is a graph showing the characteristics of the acoustic correction circuits shown in FIGS. 8(a) and (b).

As apparent from this wave form, unlike the voltage wave form obtained at the point (B), there is obtained a continuous wave form, which allows a greater degree of latitude for subsequent signal processing. The signal obtained at the point (D) is supplied to acoustic correction circuits of three different kinds including an acoustic correction circuit A 334 of a characteristic frequency represented by a curve A in FIG. 10; another acoustic correction circuit B 335 of a characteristic frequency is represented by a curve B in FIG. 10; and a further acoustic correction circuit C 336 of a characteristic frequency is represented by a straight line in FIG. 10. With the signal passing through these acoustic correction circuits 334, 335 and 336, the loudness or volume of environmental sound or noise around the camera collected by the sound emitting element 308 can be measured with a characteristic closely resembling the human sense of hearing. Besides, one of the three different kinds of characteristics A, B and C is selected according to the level of the ambient noises or environmental sound through the analog switches 337, 338 and 339, which will be further described hereinafter. More specifically stated, the characteristic of curve A is selected for ambient noises or environmental sound not exceeding 60 dB (0 dB=0.0002 μbar); the curve B is selected when the ambient noises or environmental sound is between 60 and 85 dB; and the straight line C is selected when the ambient noises exceed 85 dB. The selection is effected through the constant voltage circuit 345, the resistors 346–348, the comparators 349 and 350, the AND gate 351, the NOR gates 352 and 353 and the analog switches 337–339. The details of the acoustic correction circuits 334–336 of three different characteristics, as shown in FIG. 10, are as follows: FIGS. 8(a) and 8(b) respectively show specific examples of the acoustic correction circuit. FIG. 8(a) represents the acoustic correction circuit A 334 and FIG. 8(b) the acoustic correction circuit B 335. In FIG. 8(a), reference numerals $334_1$, $334_2$ and $334_7$ identify capacitors; $334_3$, $334_4$ and $334_6$ identify resistors; and $334_5$ and $334_8$ identify OP amplifiers serving as buffer amplifiers. A secondary high-pass filter is formed by the capacitors $334_1$ and $334_2$ and the resistors $334_3$ and $334_4$. A primary low-pass filter is formed by the resistor $334_6$ and the capacitor $334_7$. With the acoustic correction circuit A 334 provided with the secondary high-pass filter and the primary low-pass filter in this manner, the curve A is obtained as shown in FIG. 10. The acoustic correction circuit B 335, shown in FIG. 8(b), is composed of a capacitor $335_1$, a resistor $335_2$ and an OP amplifier $335_3$ which functions as buffer amplifier. The capacitor $335_1$ and $335_2$ form a primary high-pass filter. This arrangement is represented by the curve B in FIG. 10. Furthermore, with respect to the straight line C of FIG. 10, the acoustic correction circuit C 336 has a short-circuit between the input and output terminals to give a flat frequency characteristic represented by the straight line C.

The signal passes through each of these acoustic correction circuits 334–336 and is then supplied to each of the analog switches 337–339. Then, as will be further described hereinafter in detail, one of the three is selected through the analog switches 337–339 by the AND gate 351 and the NOR gates 352 and 353. In other words, the output signal of the OP amplifier 330 is solely subjected to acoustic correction according to one of the three characteristics A, B and C before it is impressed on the anode of the diode 340. The diode 340, the resistor 341 and the capacitor 342 form a mean value detection circuit. A signal obtained after the output of the OP amplifier 330 has undergone the acoustic correction process is subjected to mean value detection and is then supplied to the positive-phase input terminal of the OP amplifier 344, which functions as buffer amplifier. The attack time, after the appearance of the signal at the cathode of the diode 340 and before commencement of control of the transistor 365, is determined by means of the resistor 341 and the capacitor 342. A recovery time, after disappearance of the signal at the cathode of the diode 340 and before termination of the control of the transistor 365 is determined by the capacitor 342 and the resistor 343. The signal which has been mean-value detected on the basis of suitable attack time and recovery time, as mentioned above, is impressed from the output terminal of the OP amplifier 344 onto the positive input terminals of the comparators 349 and 350, and the resistor 361. The comparators 349 and 350 operate as follows: These comparators compare the output voltage of the OP amplifier 244 with the divided voltage obtained from the voltage of the constant voltage circuit 345, after it is divided by the resistors 346–348. The voltage level divided by the resistors 346–348 is correlated with the output voltage of the OP amplifier 344, which corresponds to the level of environmental sound or noise around the camera. The connection point between the resistors 347 and 348 corresponds to a noise level of 60 dB and the connection point between the resistors 346 and 347 to a noise level of 85 dB. During a period immediately after the power supply is turned on and before the appearance of the output voltage of the OP amplifier 344, the voltage at the positive input terminals of the comparators 349 and 350 is zero and, therefore, both the outputs of the comparators 349 and 350 are at an L level. Accordingly, the output of the NOR gate 352 is at an H level and the voltage of the terminal 337c of the analog switch 337 is also at an H level. There occurs a conductive state between the terminals 337a and 337b. As a result, the signal of the acoustic correction circuit A 334 is impressed on the anode of the diode 340. Then, a mean-value detected voltage appears at the output terminal of the OP amplifier 344. This voltage is again compared by the comparators 349 and 350 with the divided voltage obtained through the resistors 346–348. However, the outputs of these comparators 349 and 350 still remain at an L level if the level of environmental sound or noise around the camera is below 60 dB. In that case, the characteristic curve A continues to be selected for acoustic correction. Meanwhile, when the noise level exceeds 60 dB (but does not exceed 85 dB), the comparator 350 level changes to an H level while that of the other comparator 349 remains at an L level. With the comparator 350 level becoming an H level, those of the NOR gate 352 and the AND gate 351 become an L level. Then, the NOR gate 353 level becomes an H level to conduct between the terminals 338a and 338b of the analog switch 338, conductive to select the curve B for the acoustic correction. When the noise level further increases to exceed 85 dB, the levels of both comparators 349 and 350 become an H level. The level of the AND gate 351 becomes an H level. The levels of both the NOR gates 352 and 353 become an L level to select the linear characteristic or straight line C for acoustic correction. The level of the environmental sound or noise around the camera thus appears in the output of the OP amplifier 344 through the applicable acoustic correction circuit, which is selected according to the noise level. In short, a voltage corresponding to the noise level, as sensed by a human ear, appears in the output of the OP amplifier 344.

Figure 9:
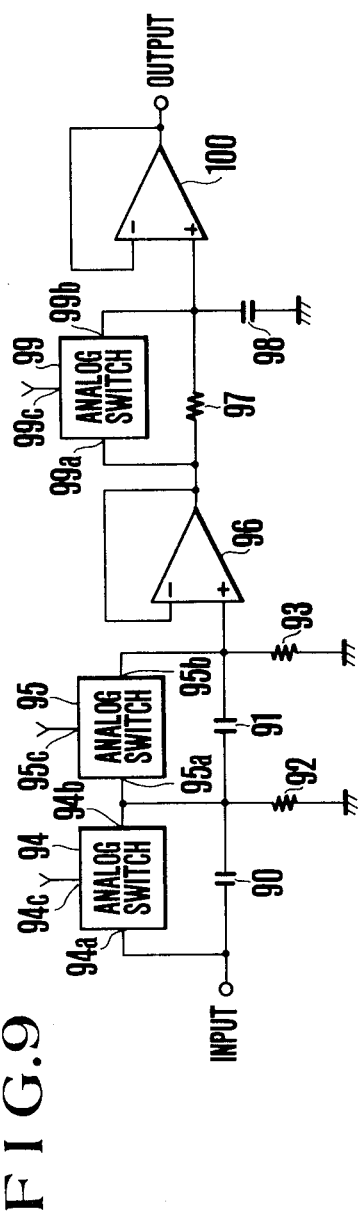
FIG. 9 is a circuit diagram showing three kinds of acoustic correction circuits, shown in FIG. 5, as combined in one circuit.

In the embodiment shown in FIG. 7, one of the three different kinds of acoustic correction circuits 334–336 are selected through the three analog switches 337, 338 and 339. However, the circuit arrangement can be simplified in a manner shown in FIG. 9. In this case, the three kinds of acoustic correction circuits are consolidated into one. FIG. 9 shows capacitors 90 and 91; resistors 92 and 93; analog switches 94 and 95; an OP amplifier 96 which functions as a buffer amplifier; a resistor 97; a capacitor 98; an analog switch 99; and another OP amplifier 100 which functions as a buffer amplifier. This arrangement operates in the following manner: When the terminals 94c, 95c and 99c of the analog switches 94, 95 and 99 are at an L level, the area between the terminals 94a and 94b, between the terminals 95a and 95b and between the terminals 99a and 99b is open to give an acoustic correction circuit, which is the same as the acoustic correction circuit shown in FIG. 8(a) having the characteristic curve A. When the terminals 94c and 99c of the analog switches 94 and 99 are at an H level and the terminal 95c of the analog switch 95 is at an L level, the parts between the terminals 94a and 94b of the analog switch 94 and between the terminals 99a and 99b of the analog switch 99 become conductive. Then, the same condition as the condition in which a resistor is connected between the ground and the input terminal of the acoustic correction circuit, shown in FIG. 8(b), is attained, which is of the characteristic curve B. However, since the input terminal has the output terminal of the OP amplifier 330, which is shown in FIG. 7, connected thereto and thus has a sufficiently low impedance, the resistance thereof is negligible. Furthermore, when all the terminals 94c, 95c and 99c of the analog switches 94, 95 and 99 are at an H level, this renders all the analog switches conductive. Then, the signal applied to the input terminals comes through the two OP amplifiers 96 and 100 which serve as buffer amplifiers and thus appears as it is in the output. In other words, the straight line C is selected for the acoustic correction. To perform the above stated actions, gates are arranged for the outputs of the comparators 349 and 350, shown in FIG. 7, and the outputs from the comparators 349 and 350 are applied to the terminals 94c, 95c and 99c of the analog switches 94, 95 and 99. With the circuit shown in FIG. 9 as described above, the acoustic correction circuits 334–336 and the analog switches 337–339 shown in FIG. 7 can be replaced with the circuit arrangement shown in FIG. 9.

Before describing further the parts of the circuit of FIG. 7 subsequent to the resistor 361 to which the output terminal of the OP amplifier 344 is connected, the signal of the OP amplifier 356 to be supplied to the resistor 360 is described as follows: The constant voltage of the constant voltage circuit 345 is applied to the information resistor 354, which operates in association with the distance ring of the lens. The variable terminal 354a of the information resistor 354 has the voltage thereof increased as the setting position of the distance setting ring of the lens comes nearer to the closest distance setting point and decreased as it gets closer to the infinity distance setting point. Therefore, the voltage appears as it is in the output of the OP amplifier 355. After that, the voltage is inverted and amplified through the resistors 357 and 358 and the OP amplifier 356. The output of the OP amplifier 356 thus increases as the distance ring's position gets closer to the infinite point. Then, the output voltage of the OP amplifier 356 and the output voltage of the OP amplifier 344 are computed through the resistors 360, 361 and 363 and the OP amplifier 359. The resistor 362 is provided for level shifting. Therefore, the output voltage of the OP amplifier 359 increases as the output voltage of the OP amplifier 344 or that of the OP amplifier 356 decreases. With the output voltage of the OP amplifier 359 increased, the base current of the transistor 365 increases through the resistor 364. The impedance between the collector and emitter of the transistor 365 then decreases. In other words, the voltage dividing ratio of the resistor 320, whose voltage divides the output of the AND gate 319 into the impedance between the collector and emitter of the transistor 365, decreases. As a result, the voltage applied to the input terminal of the amplifier 321 decreases. Furthermore, if a conductive state between the terminals 323a and 323b of the analog switch 323 is attained, the voltage impressed on the sound emitting element 308 also decreases and the self-timer operation, indicating sound which is produced from the sound emitting element 308, accordingly becomes smaller. In other words, the sound produced from the sound emitting element 308 becomes smaller when the level of the environmental sound or noise around the camera is low and the output voltage of the OP amplifier 344 is low while the distance ring of the lens is adjusted to a position closer to the nearest distance position relative to a short distance between the camera and the object to be photographed. This results in a low output voltage of the OP amplifier 356. Conversely, when either the noise level around the camera is high or the distance between the camera and the object to be photographed is great and the distance ring of the lens is adjusted to a position closer to the infinite distance setting position, the self-timer operation indicating sound produced from the element 308 becomes louder. Intermediate the above stated two converse cases, the level of the sound produced from the sound emitting element 308 is also adjusted to a suitable level in accordance with the noise level around the camera and with the setting position of the distance setting ring of the lens. With the camera set up in this manner, the self-timer operation indicating sound produced from the sound emitting element 308 during the self-timer operation is always suitably audible at the position of the object irrespectively of the ambient noise level or environmental sound and the distance between the camera and the object. The above description has been based on the assumption that the terminal 323c of the analog switch 323 is at an H level. Let us now consider the condition which determines the terminal 323c level. The output terminal of the OP amplifier 359 is connected to the negative input terminal of the comparator 368. The output of the OP amplifier 359 is compared with the voltage of the constant voltage circuit 345 divided by the resistors 366 and 367 at a comparator 368. If the output voltage of the OP amplifier 359 is higher, the output of the comparator 368 is at an L level and the inverter 77 is at an H level. There occurs a conductive state between the terminals 323a and 323b of the analog switch 323 making the sound emitting element 308 produce the sound. However, when the output voltage of the OP amplifier 359 is lower than the voltage of the connection point between the resistors 366 and 367, the level of the output of the comparator 368 becomes an H level. The level of the inverter 377 becomes an L level and an open state occurs between the terminals 323a and 323b of the analog switch 323. Under this condition, the sound emitting element 308 never produces any sound not even during a self-timer operation. In this case, since the level of a terminal 376c of an analog switch 376 is at an H level, a conduction occurs between terminals 376a and 376b. Then, as will be further described in detail hereinafter, the light emitting diode 309 flickers in place of the sound emitting operation of the sound emitting element 308. In short, the self-timer operation indicating element shifts from the sound emitting element 308 to the light emitting diode 309 when the output voltage of the OP amplifier 359 becomes lower than a predetermined value. In other words, when a high noise level around the camera prevents confirmation of the sound of the sound emitting element from the position of the object to be photographed or when the distance setting ring of the lens is adjusted to a position corresponding to an excessively long distance between the camera and the object for confirmation of the sound, or if both conditions occur, the self-timer operation indicating function is switched over from the sound emitting element 308 to the light emitting diode 309 to permit visual confirmation of the self-timer operation in place of auditory confirmation. In this particular embodiment, the reasons for the change-over of the self-timer operation indicating element from the sound emitting element 308 to the light emitting diode 309 are confirmable by the color of the light emitted from the light emitting diode 309. This light emitting diode 309 is a variable color light emitting diode and is shown in FIG. 11.

Figure 11:
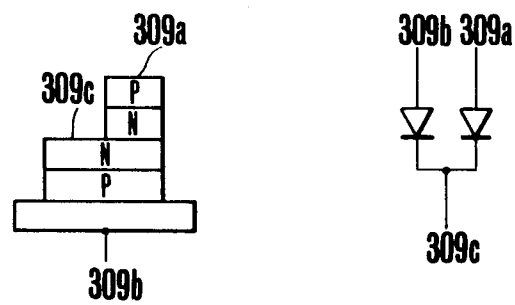
FIG. 11 is a schematic view showing a light emitting diode shown in FIG. 5.

FIG. 11 includes a schematic illustration and an equivalent circuit diagram showing the light emitting diode shown in FIGS. 3 and 7. This element is a single pellet type variable color light emitting diode which is composed of a single GaP pellet and has a green light emitting part and a red light emitting part. The green color light is emitted when a current flows from a point 309a to a point 309c and the red color light is emitted when a current flows from a point 309b to the point 309c. A yellow color light is emitted when a current flows simultaneously from the point 309b to the point 309c and from the point 309a to the point 309c.

Meanwhile, the comparator 368 produces, as mentioned in the foregoing an output at an H level under a condition in which the sound of the sound emitting element 308 becomes inaudible from the position of the object irrespective of the reason for the inaudible condition. The positive input terminal of the comparator 369 is connected to the output terminal of the OP amplifier 344 and the comparator compares the output of the OP amplifier 344 with a predetermined voltage. As a result of this comparison, the H level output is produced from the comparator 369 when the ambient noise or environmental sound around the camera is too loud for sound confirmation of the sound emitting element from the position of the object. The comparator 370 has its positive input terminal connected to the output terminal of the OP amplifier 355 and compares the output of the OP amplifier 355 with a predetermined voltage and produces an H level output when the distance to the object to be photographed (as obtained by adjusting the distance ring of the lens) is too long for sound confirmation of the sound emitting element 308.

Four conditions under which the output of the OP amplifier 359 becomes lower than a predetermined voltage and the level of the comparator 368 becomes an H level are described as follows:

(i) When the environmental sound or noise around the camera is too loud:

The level of the comparators 368 and 369 become an H level and the level of the comparator 370 an L level. Therefore, the level of the AND gate 373 becomes an L level; that of the OR gate 374 an H level; and that of the OR gate 375 an L level. Furthermore, the output of the AND gate 319 is applied to the input terminals of the AND gate 378 and 379 through the analog switch 376 and the same signal as that of the AND gate 319 appears only in the output of the AND gate 378. As a result, at the light emitting diode 309, the element $309_2$ solely flickers red at intervals of $\frac{1}{2}$ sec (and at 1 KHz to be more specific).

(ii) When the distance between the camera and the object is too long:

The output levels of the comparators 368 and 370 become high (H level) and that of the comparator 369 becomes low (L level). Accordingly, the output level of the AND gate 373 becomes low. The output level of the OR gate 374 becomes low and that of the OR gate 375 becomes high. This causes the element $309_1$ of the light emitting diode 309 to solely flicker green at intervals of $\frac{1}{2}$ second.

(iii) When conditions (i) and (ii) above simultaneously occur:

All the levels of the comparators 368, 369 and 370 become high (H level). Accordingly, the level of the AND gate 373 becomes low (L level); and those of the OR gates 374 and 375 become high. Therefore, the current flows to both the elements $309_1$ and $309_2$ of the light emitting diode 309. The diode 309 then flickers yellow at intervals of $\frac{1}{2}$ sec.

(iv) When a combination of ambient noise or environmental sound level around the camera and the distance between the camera and the object to be photographed prevents auditory confirmation of the sound of the sound emitting element from the position of the object while the ambient noise or environmental sound and the distance do not singly exceed their critical values:

The output level of the comparator 368 becomes high and those of the comparators 369 and 370 become low. Accordingly, the output levels of the OR gate 374 and 375 become high flowing current to both the element $309_1$ and $309_2$ of the light emitting diode 309. Therefore, the diode flickers yellow at intervals of $\frac{1}{2}$ sec in the same manner as in condition (iii).

Briefly stated, with the camera set in a self-timer operating state, when the release button is depressed the second stroke thereof, the self-timer begins to operate. Then, when the sound of the sound emitting element is audible from the position of the object to be photographed, the sound emitting element is employed as the self-timer operation indicating element. Under such a condition, the volume or loudness of the sound is adjusted to make the sound audible at the position of the object with an unvarying suitable volume or loudness in accordance with the ambient noise or environmental sound level and the distance between the camera and the object. Furthermore, when an increase in the ambient noise or environmental sound renders the sound of the sound emitting element hardly audible, the self-timer operation indicating element is switched over from the sound emitting element to the light emitting diode. Then, the latter informs the camera use of an excess of ambient noise or environmental sound by flickering red. Where the distance between the camera and the object renders the sound of the sound emitting element hardly audible, the self-timer operation indicating element is likewise switched over to the light emitting diode, which this time informs the camera user of the excessive distance by flickering green. If the sound of the sound emitting element is rendered inaudible by a combination of the level of the ambient noise or environmental sound and the distance between the camera and the object, the self-timer operation indicating element is likewise switched over to the light emitting diode, which this time flickers yellow to indicate that the switch-over is not solely caused by the noise level or the distance between the camera and the object. Upon completion of the self-timer operation, which is indicated by the sound emitting element or the light emitting diode, the shutter is operated to begin and complete an exposure.

As described in the foregoing, in the embodiment, the setting position of the distance ring of the lens is electrically detected. When the detected setting position exceeds a given critical value, the analog switch arrangement is shifted to switch over the self-timer operation indicating element from the sound emitting element to a light emitting element to permit visual confirmation of the self-timer operation instead of auditory confirmation by the sound of the sound emitting element. This arrangement not only permits an efficient display of the self-timer operation but also broadens the display or indication discernible range.

Next, a fourth embodiment of the invented self-timer device is described below:

In the fourth embodiment, the camera employs a sound emitting element as the self-timer operation indicating element, which has the volume or loudness of the sound thereof variable in relation to the distance between the camera and the object to be photographed. The relation of the volume or loudness of the sound to the distance is shiftable from one for indoor use to one for outdoor use.

In each of the self-timer devices of the first, second and third embodiments, the volume or loudness of the sound produced from the sound emitting element varies relative to the distance to the object to make the sound audible with unvarying loudness or volume irrespectively of the distance between the camera and the object to be photographed. Moreover, in these embodiments, the volume or loudness of the sound varies only in an unconditional manner. In accordance with such an arrangement, there arise some conditions where it is difficult to keep the loudness or volume of the sound of the sound emitting element, as heard at the position of the object, from varying. The reason for this is as follows: A sound pressure $PN/m^2$ at a point E at a distance m from a sound source of acoustic power Eerg/s, in a completely diffusing acoustic field, can be expressed by the following:

$$\frac{P^2}{P_0 C^2} = \frac{E}{4\pi C}\left[\frac{Q}{r^2} + \frac{16\pi(1-\bar{a})}{S\bar{a}}\right]$$

wherein reference numeral Po identifies the density of air; reference numeral C identifies the velocity of the acoustic wave; reference numeral Q identifies a directivity factor; reference numeral S identifies the internal volume or loudness of the room; and reference numeral α identifies mean acoustic absorptivity.

Figure 14:
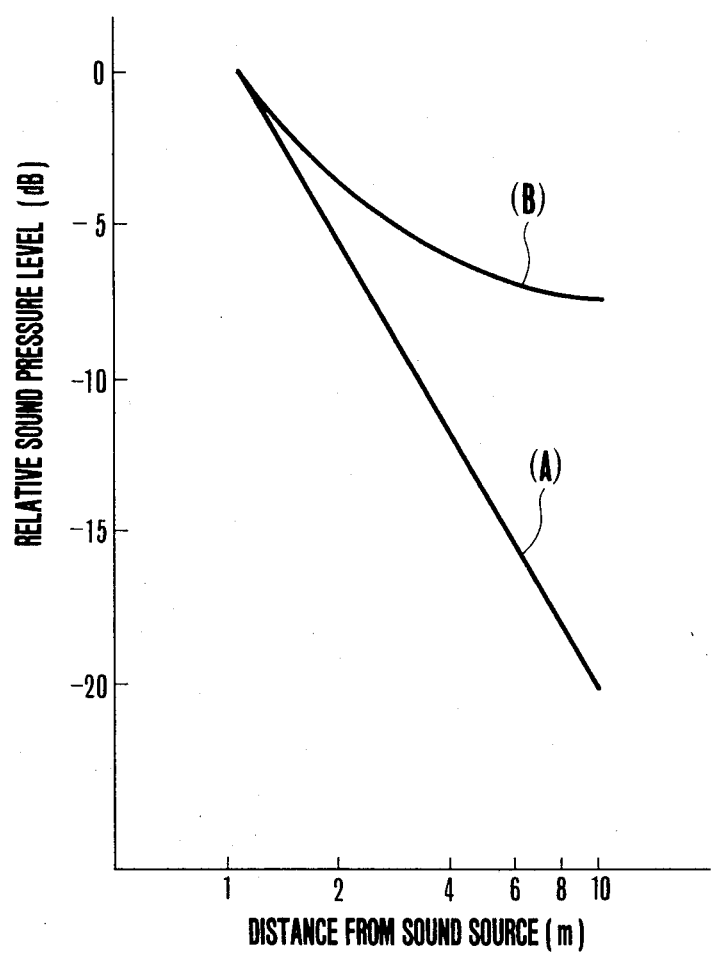

Based on the above formula, the sound transmission characteristic of a free acoustic field which is completely free from reflection and that of an ordinary room having an ordinary mean acoustic absorptivity can be expressed in a graph shown in FIG. 14.

In FIG. 14, the distance from the sound source is shown on the axis of abscissa while the axis of ordinate shows the relative sound pressure level with a point 1 meter away from the source of sound used as the reference. A curve A represents the characteristic of a free acoustic field (an outdoor space is close to this) having no reflecting matters. In this case, the sound pressure level is linearly in inverse proportion to the distance. A curve B represents the transmission characteristic in an ordinary indoor room (diffusing acoustic field) of mean absorptivity $\alpha = 0.1$. As apparent from FIG. 14, in order to keep the sound pressure nearly unvarying, at the position of the object to be photographed by varying the relation of the volume or loudness of the sound of the sound emitting element to the distance between the camera and the object, it is necessary to arrange this relation to be shiftable between indoor use (for diffusing acoustic field) and outdoor use (for free acoustic field). This purpose can be attained by impressing a voltage on the sound emitting element in such a way as to invert the transmission characteristic of the outdoor use (free acoustic field) and the indoor use (diffusing acoustic field), as shown in FIG. 15. FIG. 15 shows the relation of the relative level of the voltage to be impressed on the sound emitting element to the distance from the sound source. A point 1 meter away from the sound source is used as the datum point. The distance from the sound source is shown on the abscissa axis while the relative voltage level to be impressed on the sound emitting body is shown on the ordinate axis. In FIG. 15, a curve (A) represents an outdoor space (free acoustic field) and another curve (B) an indoor space (diffusing acoustic field).

To solve the problem mentioned in the foregoing, this embodiment is arranged in the following manner: The voltage level to be impressed on the sound emitting element is varied in a manner shown by the line (A) of FIG. 15 for outdoor use or in a manner shown by the curve (B) of FIG. 15 for indoor use. Besides, the self-timer device permits switchover between these two different voltage level impressing manners. This arrangement enables the volume or loudness of the sound of the sound emitting element to be heard at the position of the object to be photographed almost unvarying irrespective of whether the camera is used indoors or outdoors. The fourth embodiment of the invention is shown in FIG. 13 in a block diagram.

Figure 13:
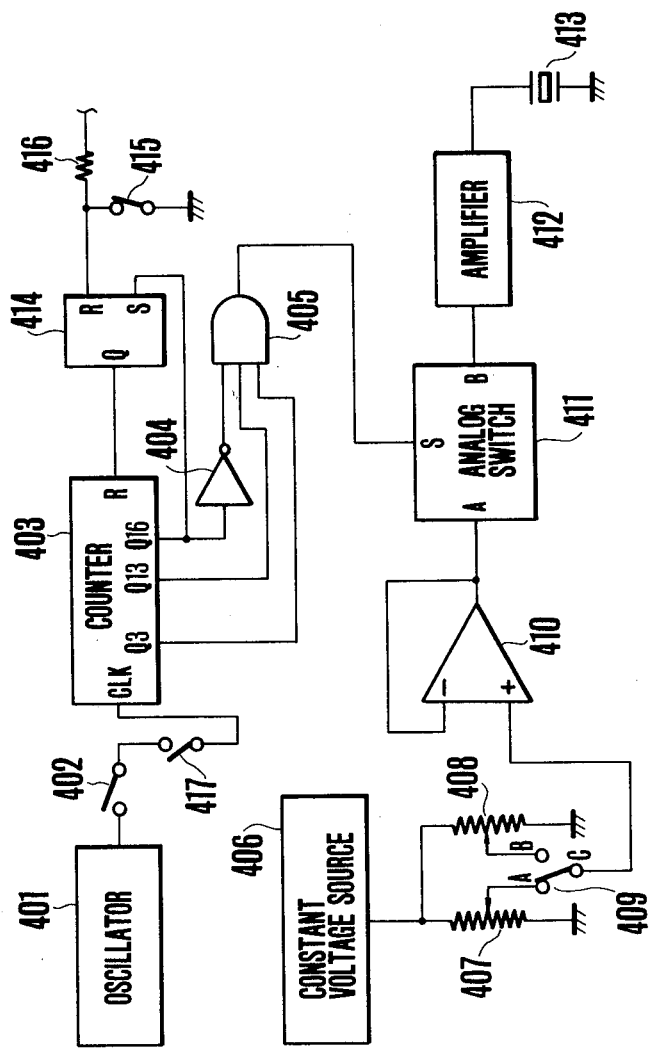
FIG. 13 is a block diagram showing a self-timer device in a fourth embodiment of the invention.

Referring now to FIG. 13, the fourth embodiment includes an oscillator 401 which generates clock pulses at a basic frequency of 8.192 KHz; a switch 402 which operates in response to the second stroke of a shutter button which is not shown; and a counter 403 which has the clock pulses from the oscillator 401 supplied to the terminal CLK thereof when the switch 402 is on and produces different frequency divided outputs from the terminals Q3, Q13 and Q16 thereof. These terminals respectively produce pulses of frequencies 1.024 KHz, 1 Hz and 0.125 Hz. A terminal R of the counter 403 is connected to a terminal Q of an RS flip-flop 414 which will be described hereinafter. When the terminal R of the counter 403 is at a high level, no frequency dividing action is performed even if the clock pulses are supplied to the terminal CLK and the outputs of the terminals Q of the counter 403 remain at low levels. The output of the terminal Q16 of the counter 403 is inverted by an inversion gate 404. The output of the inversion gate 404 and the outputs of the terminals Q3 and Q13 of the counter 403 are supplied to an AND gate 405. The output terminal of the AND gate 405 is connected to a terminal S of an analog switch 411 which will be described hereinafter. There is provided a constant voltage source 406 which is connected to variable resistors 407 and 408 and which provide a constant voltage. The variable resistor 407 has one of the fixed terminals connected to the constant voltage source and the other grounded. The variable terminal thereof, which is indicated by an arrow, is connected to a terminal A of a change-over switch 409 which will be described hereinafter. The variable resistor 408 has one of the fixed terminals thereof also connected to the constant voltage source while the other is grounded. The variable terminal of the variable resistor 408 which is indicated by an arrow is connected to a terminal B of the change-over switch 409. These variable terminals of the variable resistors 407 and 408 operate in association with distance setting means such as a distance ring of a lens, which is not shown, in such a manner that: The resistance value between the variable terminals and the ground increases and the voltage of the variable terminals increases when the distance ring is set at a long distance position. It decreases and the voltage of the variable terminals decreases when the distance ring is set at a short distance position. The voltage characteristics of the variable resistors 407 and 408 differ from each other relative to the distance. The variable resistor 407 is provided for outdoor use and has a characteristic represented by a straight line (A) in FIG. 15. The other variable resistor 408 is provided for indoor use and has a characteristic represented by a curve (B) in FIG. 15. The change-over switch 409 has the terminals A and B thereof connected respectively to the variable terminals of the variable resistors 407 and 408, as mentioned above. The terminal A is for outdoor use and the terminal B for indoor use. Meanwhile, a terminal C of the change-over switch 409 is connected to the non-inversion input terminal of an OP amplifier 410, which is connected as follower and thus converts the voltage supplied to its non-inversion input terminal to a low impedance and to produce it as it is. When a terminal S of the above stated analog switch 411 is at a high level, a short-circuit takes place between the terminals A and B of the analog switch 411 to switch it on. The terminal A is connected to the output terminal of the OP amplifier 410 and the terminal B to the input terminal of an amplifier 412, while the terminal S is connected to the output terminal of the AND gate 405. The amplifier 412 has a sufficient gain for driving a sound emitting element 413 which will be described hereinafter. The sound emitting element 413 has one terminal thereof connected to the output terminal of the amplifier 412 while the other terminal is grounded. The sound emitting element 413 is an electric-to-sound converter such as a piezo-electric buzzer or an electromagnetic speaker or the like. The embodiment further includes the RS flip-flop 414. A terminal S of the flip-flop 414 is connected to the terminal Q16 of the counter 403 and the output terminal Q thereof to the terminal R of the counter 403. In the embodiment are further included switches 415 and 417, which close when film is wound up and which open in response to a shutter operation terminating action, the switches 415 and 417 which form an interlocking switch; and a resistor 416. One terminal of the resistor 416 is connected to a power source while the other terminal thereof is connected to a terminal R of the flip-flop 414 and also to the terminal of the switch 415.

The embodiment, which is described above, operates in the following manner: The power source effects the power supply to each part shown in FIG. 13 when a shutter button of the camera, which is not shown, is depressed the first stroke thereof. This renders such part operative. Then, with the film wound up, the switch 417 is closed. Then, the second depressing stroke on the shutter button closes the switch 402 which is interlocked therewith. With the switch 402 closed, the clock pulses of 8.192 KHz generated at the oscillator 401 are supplied to the terminal CLK of the counter 403. The terminals Q3, Q13, and Q16 of the counter 403 respectively produce clock pulses of 1.024 KHz, 1 Hz and 0.125 Hz. The three outputs of the counter 403 including the outputs Q3 and Q13 and another output Q16 which is inverted through the inversion gate 404 are supplied to the AND gate 405. In the output of the AND gate 405, the pulses of 1.024 KHz are intermittently produced at intervals of 0.5 sec. for an initial period of 8 sec., because: Since the switch 415 is closed together with the switch 417 with film winding completed, the terminal R of the flip-flop 414 is at a low level and the terminal Q16 of the counter 403 changes from a low level to a high level 8 seconds after the clock pulses are supplied to the terminal CLK of the counter 403 (1/0.125 Hz) while the terminal S of the flip-flop 414 changes likewise. Therefore, the output level of the terminal Q of the flip-flop 414 becomes high after 8 sec. Then, the level of the terminal R of the counter 403, which is connected to the output terminal Q, also becomes high to stop the frequency dividing action at that point of time. In the meantime, to trigger a shutter trigger circuit which is not shown, the output Q16 of the counter 403 is provided to permit a self-timer operation for just 8 sec. With the shutter trigger circuit triggered, the shutter operation begins and ends at a suitable point of time. In association with the termination of the shutter operation, the switch 417 is opened. Therefore, the clock pulses are no longer supplied to the terminal CLK of the counter 403. The counter 403 thereafter does not perform the frequency dividing action until the film is again wound up and a release attained.

The volume or loudness of the warning sound produced during the self-timer operation is as follows: In outdoor use, that is, when the terminal C of the switch 409 is connected to the terminal A thereof with a constant voltage from the constant voltage source 406 impressed on the variable resistors 407 and 408 which operate according to the distance setting position of the lens which is not shown, the voltage of the variable terminal of the variable resistor 407 is applied to the non-inversion input terminal of the OP amplifier 410 which is follower connected thereto. Accordingly, the voltage of the variable terminal of the variable resistor 407 appears as it is in the output of the OP amplifier 410. The output of the OP amplifier 410 is supplied to the terminal A of the analog switch 411. However, since the terminal S of the analog switch 411 has the output of the AND gate 405 supplied thereto, the voltage of the OP amplifier 410 is switched by the output of the AND gate 405 and thus appears at the terminal B of the analog switch 411. Then, the output of the terminal B of the analog switch 411 is amplified by the amplifier 412 to a sufficient extent for driving the sound emitting element 413. The output of the amplifier 412 is impressed on the sound emitting element 413. Then, as mentioned in the foregoing, a second depression stroke operation on tne shutter button thereof causes the sound emitting element 413 to produce a pulse sound of a basic frequency of 1.024 KHz at intervals of 0.5 sec. over a period of 8 sec. However, since the variable resistors 407 and 408 are interlocked with the distance ring of the lens which is not shown, the crest value of the pulses impressed on the sound emitting element 413 varies according to the distance setting value of the lens. Accordingly, the volume or loudness of the sound produced from the sound emitting element 413 likewise varies.

As mentioned above, the variable resistor 407 serves for outdoor use and the voltage of the variable terminal thereof has a characteristic represented by the straight line (A) in FIG. 15. The other variable resistor 408 on the other hand serves for indoor use and the voltage of the variable terminal thereof has a characteristic which is represented by the curve (B) in FIG. 15. Such being the embodiment, the volume or loudness of the sound of the sound emitting element 413 as heard at the position of the object can be kept almost unvarying regardless of whether the camera is used indoors or outdoors.

An advantage of the embodiment thus resides in that the relation between the distance setting value of the lens and the sound volume or loudness of the sound emitting element is shiftable between a relation for outdoor use and another relation for indoor use having the sound volume or loudness from the sound emitting element nearly unvarying as heard at varied distances of the object's position regardless of whether the camera is used outdoors or indoors.

In this embodiment, the voltages from two variable resistors are switched over from one to the other in association with the distance ring of the lens. However, the present invention is not limited to this arrangement. In cases where a distance measurement signal is obtainable from an automatic focusing system, as in the case of an automatic focusing camera, the distance measurement signal may be weighted and the same advantageous effect as in the above described embodiment may be obtained to switch over one weighting amount to another.

Furthermore, the invention is not only applicable to ordinary photographic cameras but is also applicable to other varied kinds of cameras, such as a magnetic disc camera, a video camera, a still video camera, a cinematographic camera, etc. It is expected that such applications to varied kinds of cameras will find a wider range of invention advantages.

What I claim:

1. In a camera with a display for the operation of a self-timer, an arrangement comprising:
    (a) a sound producer incorporated in said camera;
    (b) signal forming means for detecting the position of an object to be photographed for producing an output signal corresponding to the object position; and
    (c) control means responsive to detection by said signal forming means of the object position becoming distant for increasing the volume of said sound producer.
2. The arrangement of claim 1, wherein said signal forming means comprises:

a focus ring of a camera; and
means cooperating with said focus ring for producing an output signal corresponding to the focusing distance as the object position signal.

3. The arrangement according to claim 1, wherein said object position signal forming means comprises:
automatic focusing means; and
means receptive of a signal produced from said automatic focusing means for producing an output signal corresponding to the focusing distance as the object postion signal.

4. In a camera with a display for the operation of a self-timer, an arrangement comprising:
(a) a sound producer incorporated in said camera;
(b) a light producer incorporated in said camera;
(c) signal forming means for detecting the position of an object to be photographed for producing an output signal corresponding to the object position; and
(d) control means responsive to one level of the output of said object position signal forming means which represents the fact that the object position has become distant for varying the volume of said sound producer to a larger level and responsive to another level of the output of said object position signal forming means which represents the fact that the object position is farther than a prescribed position for driving said light producer to operate, whereby the operation of said self-timer is displayed in different forms selectively.

5. The arrangement according to claim 1, wherein means are included to increase the rate of said signal sound volume or loudness to said distance in accordance with a sound field of the camera environment.

6. In a camera with a display for the operating of a self-timer, an arrangement comprising:
(a) a sound producer incorporated in said camera;
(b) a light producer incorporated in said camera;
(c) signal forming means for detecting the position of an object to be photographed for producing an output signal corresponding to the object position; and
(d) control means responsive to one level of the output of said object position signal forming means which represents the fact that the object position has become distant for varying the volume of said sound producer and responsive to another level of the output of said object position signal forming means which represents the fact that the object distance is father than a prescribed position for stopping the operation of said sound producer whereby a display for the operation of said self-timer is presented by said light producer as it is energized.

7. The arrangement according to claim 6, wherein said control means includes:
(a) memory means for memorizing the prescribed object position;
(b) sound producer driving means for driving said sound producer so as to increase the volume of said sound producer in response to the signal corresponding to the object position detected by said object position signal forming means;
(c) light producer driving means for driving said light producer to operate; and
(d) control means responsive to detection of when the object position sensed by said object position signal forming means has become farther than the object position stored on said memory means for stopping the operation of said sound producer driving means and initiating an operation of said light producer driving means.

8. A camera with a display for the operation of a self-timer according to claim 6, wherein said sound producer driving means and said light producer driving means each are means for periodically driving said sound producer or said light producer.

9. The arrangement according to claim 7, wherein said sound producer driving means further includes:
control means for increasing the volume of said sound producer; and
changeover means for changing over the rate at which the volume of said sound producer in increased by said control means.

10. The arrangement according to claim 9, wherein said changeover means operates to change over between the non-linear and linear relationships of the volume of said sound producer with the object distance.

* * * * *